United States Patent
Lim et al.

(10) Patent No.: US 10,782,902 B2
(45) Date of Patent: Sep. 22, 2020

(54) DEVICE PARAMETER TUNING

(71) Applicant: Seagate Technology LLC, Cupertino, CA (US)

(72) Inventors: Choo Chiang Lim, Singapore (SG); Tse Jen Lee, Singapore (SG); Kong Yaw Lucas Lee, Singapore (SG); Jun Gu, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 144 days.

(21) Appl. No.: 16/113,481

(22) Filed: Aug. 27, 2018

(65) Prior Publication Data

US 2020/0065015 A1 Feb. 27, 2020

(51) Int. Cl.
*G06F 3/06* (2006.01)
*H04L 1/24* (2006.01)

(52) U.S. Cl.
CPC .......... *G06F 3/0634* (2013.01); *G06F 3/0604* (2013.01); *G06F 3/0676* (2013.01); *H04L 1/24* (2013.01)

(58) Field of Classification Search
CPC .................................... G06F 3/06; H04L 1/24
USPC ......................................................... 711/154
See application file for complete search history.

(56) References Cited

U.S. PATENT DOCUMENTS

| | | |
|---|---|---|
| 5,890,014 A | 3/1999 | Long |
| 6,628,301 B1 | 9/2003 | Acton et al. |
| 6,895,500 B1 | 5/2005 | Rothberg |
| 7,032,133 B1 * | 4/2006 | Lang ..................... G06F 11/263 714/32 |
| 7,162,554 B1 | 1/2007 | Cole et al. |
| 7,369,340 B1 * | 5/2008 | Dang ................. G11B 5/59688 360/31 |
| 7,567,886 B2 | 7/2009 | Beeston et al. |
| 7,660,978 B2 | 2/2010 | Forrer, Jr. et al. |
| 8,218,608 B2 | 7/2012 | Nantz et al. |
| 8,667,216 B2 | 3/2014 | Hashimoto |
| 8,930,583 B1 | 1/2015 | Shapira et al. |
| 2003/0065830 A1 * | 4/2003 | Tung ................... H04L 12/2854 710/8 |
| 2010/0191905 A1 * | 7/2010 | Tsurumi ................... G11B 5/09 711/112 |
| 2012/0307575 A1 * | 12/2012 | Aiso .................... G11C 29/028 365/189.15 |

(Continued)

*Primary Examiner* — Christopher B Shin
(74) *Attorney, Agent, or Firm* — Westman, Champlin & Koehler, P.A.

(57) ABSTRACT

A method includes providing a device with transmitter parameters set to default factory values. The method also includes receiving, in the device, one or more write commands with test data patterns, and executing, in the device, the one or more write commands to store the test data patterns on a non-transitory data storage medium of the device. The method further includes receiving, in the device, one or more read commands for the test data patterns, and reading the test data patterns from the non-transitory data storage medium. The read test data patterns are communicated by a signal that is sent via the device transmitter. A command instructing the device to update the transmitter parameters values is received, in the device, when a device transmitter signal integrity for the signal communication is below a predetermined threshold.

20 Claims, 4 Drawing Sheets

(56) References Cited

U.S. PATENT DOCUMENTS

| | | | | |
|---|---|---|---|---|
| 2013/0259100 | A1* | 10/2013 | Ichikawa | H04L 1/24 |
| | | | | 375/219 |
| 2014/0229666 | A1* | 8/2014 | Schoenborn | G11C 11/4076 |
| | | | | 711/105 |
| 2015/0002408 | A1* | 1/2015 | Mozak | H04L 25/0276 |
| | | | | 345/173 |
| 2015/0186055 | A1* | 7/2015 | Darragh | G06F 3/0616 |
| | | | | 711/103 |
| 2015/0186072 | A1* | 7/2015 | Darragh | G06F 3/0653 |
| | | | | 711/103 |
| 2017/0162276 | A1* | 6/2017 | Ok | G11C 29/38 |
| 2017/0230939 | A1* | 8/2017 | Rudolf | H04L 29/08306 |
| 2017/0270994 | A1* | 9/2017 | Glancy | G11C 11/4096 |
| 2018/0150358 | A1* | 5/2018 | Wang | G06F 9/4401 |
| 2018/0335828 | A1* | 11/2018 | Chun | G06F 1/3275 |
| 2020/0044795 | A1* | 2/2020 | Yamaguchi | H04L 1/244 |

* cited by examiner

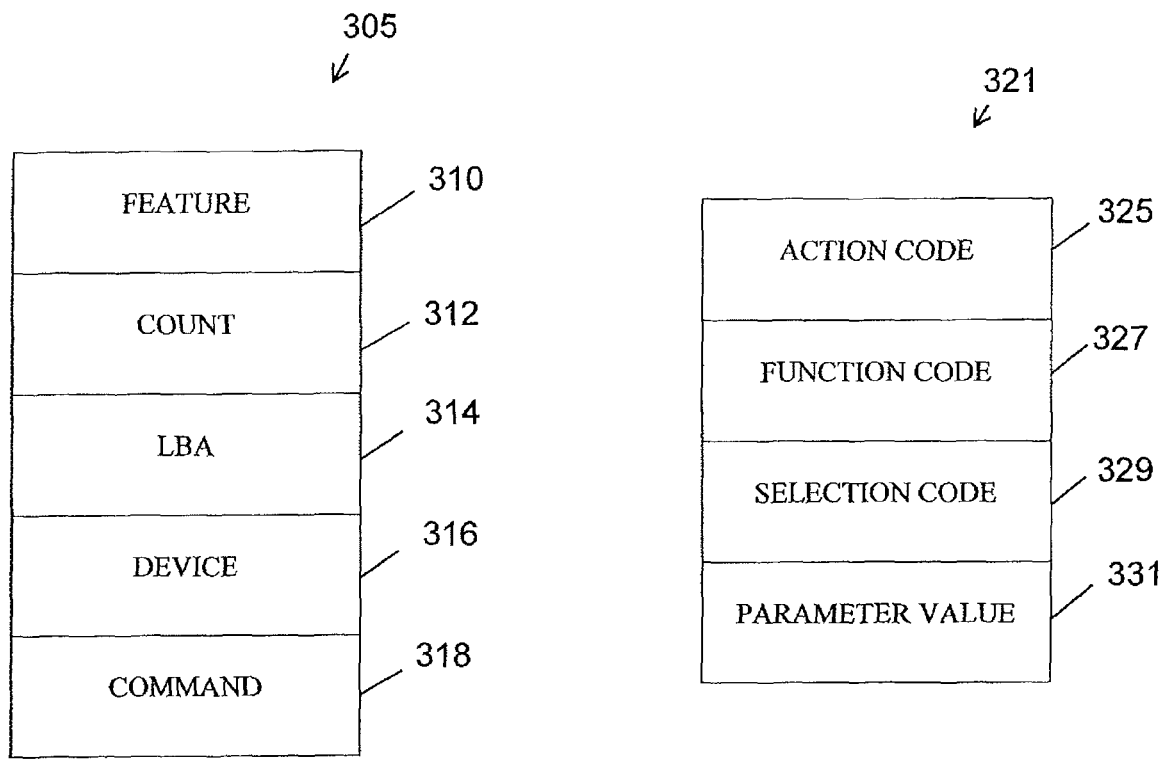
FIG. 3A
FIG. 3B
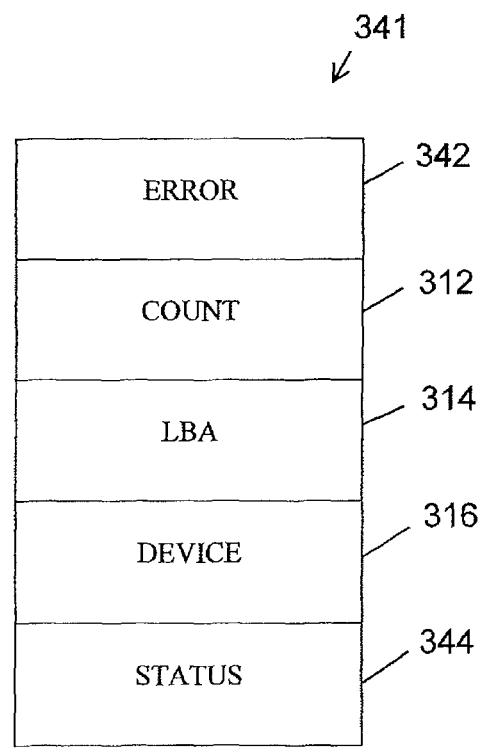
FIG. 3C

DEVICE PARAMETER TUNING

SUMMARY

In one embodiment, a method of tuning a device transmitter is provided. The method includes providing a device with transmitter parameters set to default factory values. The method also includes receiving, in the device, one or more write commands with test data patterns, and executing, in the device, the one or more write commands to store the test data patterns on a non-transitory data storage medium of the device. The method further includes receiving, in the device, one or more read commands for the test data patterns, and reading the test data patterns from the non-transitory data storage medium. The read test data patterns are communicated by a signal that is sent via the device transmitter. A command instructing the device to update the transmitter parameters values is received, in the device, when a device transmitter signal integrity for the signal communication is below a predetermined threshold.

In another embodiment, a data storage device is provided. The data storage device includes a memory having data storage device transmitter parameters stored therein, and a control circuit communicatively coupled to the memory. The control circuit is configured to adjust values of the data storage device transmitter parameters in the memory in response to receiving transmitter parameter update commands.

In yet another embodiment, a method is provided. The method includes providing a data storage device with transmitter parameters set to default factory values. The method also includes providing transmitter parameter tuning features in the data storage device that enable adjustment of the transmitter parameter values without any modifications to firmware of the data storage device.

This summary is not intended to describe each disclosed embodiment or every implementation of tuning device transmitter parameters. Many other novel advantages, features, and relationships will become apparent as this description proceeds. Other features and benefits that characterize embodiments of the disclosure will be apparent upon reading the following detailed description and review of the associated drawings.

BRIEF DESCRIPTION OF THE DRAWINGS

FIGS. 3A-3C are diagrammatic illustrations showing examples of command fields according to embodiments of the disclosure.

DETAILED DESCRIPTION

Figure 1:
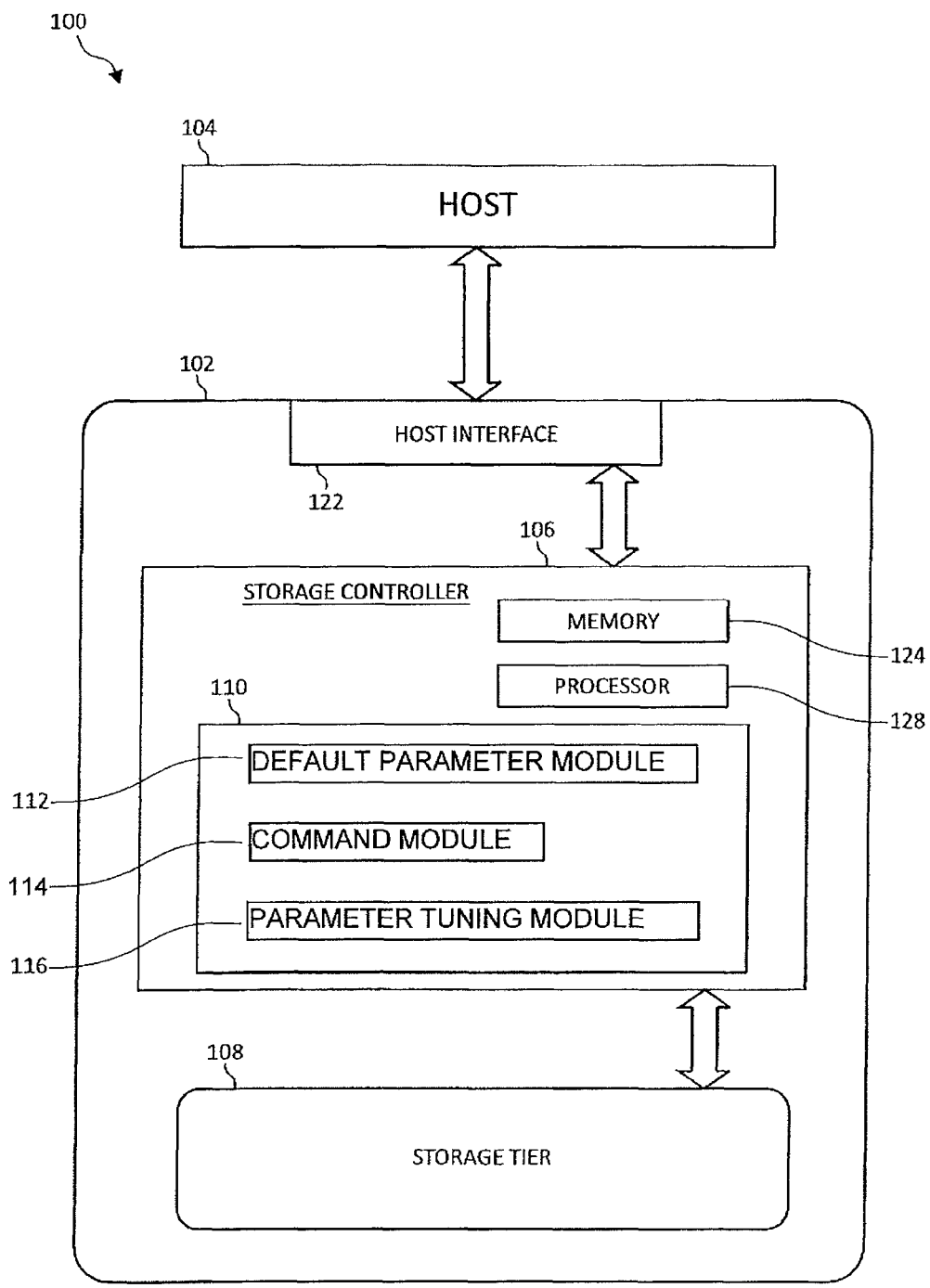
FIG. 1 is a block diagram of an example apparatus having a data storage device in accordance with one embodiment.

Although the present disclosure has been described with reference to embodiments, workers skilled in the art will recognize that changes may be made in form and detail without departing from the scope of the disclosure. The present disclosure generally describes tuning data storage device (DSD) transmitter parameters for optimum communication between the DSD and a host system.

Data storage devices (DSDs) are typically included in systems having one or more host computers. Examples of DSDs include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

As the speed of digital devices, such as DSDs, increases, signal integrity becomes a greater problem due to a transmission line effect associated with high frequencies. Digital designs have not traditionally suffered due to issues associated with transmission line effects. Serial Advanced Technology Attachment (SATA) is a computer bus interface that connects host bus adapters to DSDs, and at lower frequencies, such as those associated with first-generation SATA and second-generation SATA, signals remain within data characterization and the systems perform as designed. However, as speed increases, (e.g., third generation SATA), high frequency effects may occur and signal integrity becomes problematic. Currently, when a host system is to be integrated with a product device, such as a DSD using third generation SATA, the host system may be submitted to the device manufacturer to tune the device transmitter parameters to the host system to ensure signal integrity. To carry out such device transmitter parameter tuning, the manufacturer may alter the device (e.g., DSD) firmware to include modified device transmitter parameters each time there are signal integrity issues during tuning. The altered firmware with the modified/adjusted device transmitter parameters is compiled, and the compiled altered firmware is downloaded to the device (e.g., DSD). The process of altering, compiling and downloading the firmware for each iteration of the transmission parameter tuning process is substantially time consuming and therefore costly.

Embodiments of the disclosure provide a device transmitter parameter tuning feature that enables a host system to tune and select device transmitter parameters that substantially match its system without submitting the host system to the device (e.g., DSD) manufacturer. Providing the device parameter tuning feature involves the development of new transmission parameter update-related commands for implementation in, for example, a device driver of the host, and further involves the development and implementation of firmware with new transmitter parameter update features in the device. The new transmitter parameter update features render the device capable of interpreting and executing the transmitter parameter update-related commands sent by the host. As will be described in detail below, the ability to interpret and execute the transmitter parameter update-related commands in the device eliminates the previously-noted steps of compiling and downloading firmware into the device (e.g., DSD) each time the device transmitter parameters are changed during tuning, thereby saving time and reducing cost. Additionally, as indicated above, the step of sending the host computer to the device (e.g., DSD) manufacturer for device tuning is saved, which eliminates the device manufacturer's significant burden of device tuning and protects the manufacturer of the host computer from exposing any new host system technology to the DSD manufacturer.

In some embodiments, the device transmitter parameter tuning feature includes an ATA communications protocol feature, such as a Self-Monitoring Analysis and Reporting Technology (SMART) Command Transport feature, e.g., SCT feature. SCT is a communications protocol for DSDs that may be employed for diagnostic, monitoring, and other uses. The SCT feature may include an action code to enable the host system to tune or modify a device's SATA transmitter parameters to a setting that matches the host system and provides improved signal integrity. An example of a DSD in which a device's transmitter parameters may be tuned to a host system is described below in connection with FIG. 1.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a block diagram of an example apparatus 100 that includes a DSD 102 in accordance with one embodiment. DSD or device 102 includes a storage controller or control circuit 106 that communicatively couples a storage tier 108 to a host 104 via a host interface or device transmitter 122. In an implementation, the storage tier 108 is a dynamic storage tier. The storage controller 106 provides a mechanism to allow the host 104 to store data to and retrieve data from the storage tier 108. In an implementation, the storage tier 108 may be a main data store. The storage tier 108 may include without limitation one or more of magnetic data storage discs, optical data storage discs, non-volatile random access memory (RAM), such as NAND Flash memory and a volatile RAM storage medium such as dynamic random access memory (DRAM).

The storage controller or control circuit 106 may utilize communication interfaces and protocols including SATA, SCSI (small computer system interface), eSATA (external serial advanced technology attachment), SAS (serial attached SCSI), USB (universal serial bus), and others to communicate with the host 104 via the device transmitter 122. The storage controller 106 also has a management module 110 which may include sub-modules to carry out a transmitter tuning process in device 102.

As can be seen in FIG. 1, the storage controller 106 also includes a memory 124 that may be used for storing data and/or one or more modules such as module 110 in some embodiments. It should be noted that, in different embodiments, module 110 may comprise hardware, software and/or firmware. The storage controller 106 further includes a processor 128. The processor 128 may perform functions of the storage controller 106 including functions disclosed herein as performed by module 110. The processor 128 may execute instructions stored on non-transitory computer readable media to perform the functions of the storage controller 106.

Device 102 may include transmitter parameter tuning capabilities which enables host 104 to tune or modify device 102 transmitter parameters to achieve an optimal setting for signal integrity. In general, control circuit 106 is configured to adjust the device 102 transmitter parameters to a provide communication signal integrity between the device 102 and host 104 with the help of module 110. In one embodiment, module 110 may include multiple sub-modules. The sub-modules may include a default parameter module 112, a command module 114, and a parameter tuning module 116. Default parameter module 112 provides default transmitter parameter values, e.g., factory default values, as a starting point for device transmitter tuning process. The default parameter module 112 may also provide an option for resetting transmitter parameter values to the factory default values which may also enable the tuning process to be restarted. Command module 114 may communicate with host 104 to receive transmitter tuning commands, e.g., SCT commands, from host 104, and respond to host 104 queries to enable transmitter tuning operations. Parameter tuning module 116 may be capable of changing device 102 parameter values in accordance with commands received by host 104 through command module 114, and may also include one or more transmitter parameters with one or more values in a parameter register.

Amplitude and emphasis are two parameters that affect signal characteristics and they may be adjusted to tune a device transmitter. Amplitude may be adjusted to change an intensity of the signal, for example, a communication signal's amplitude provided by device transmitter 122 when communicating with host 104. Amplitude may also be adjusted to minimize jitter, which is a noise and an attenuation effect that occurs when the signal propagates through a transmission path. Emphasis may be adjusted to alter the magnitude of higher frequencies with respect to the magnitude of lower frequencies, for example, a communication signal's emphasis provided by device transmitter 122 when communicating with host 104. Altering emphasis may improve the overall signal-to-noise (s/n) ratio by minimizing the adverse effects of attenuation distortion or saturation.

Signal integrity may be monitored by connecting an oscilloscope to a communication bus between device 102 and host 104. Then, a display of the oscilloscope in which a digital signal from a receiver is repetitively sampled with successive waveforms superimposed to form a composite image may be examined. This may give an indication of the signal quality in the digital domain and illustrate various features of the measurements such as amount of distortion, time variations, amount of jitter, and the slope or sensitivity to timing error. Based on such an examination, a decision may be made as to whether to modify the device transmitter parameters in accordance with embodiments of the disclosure. One method embodiment is described below in connection with FIG. 2.

Figure 2:
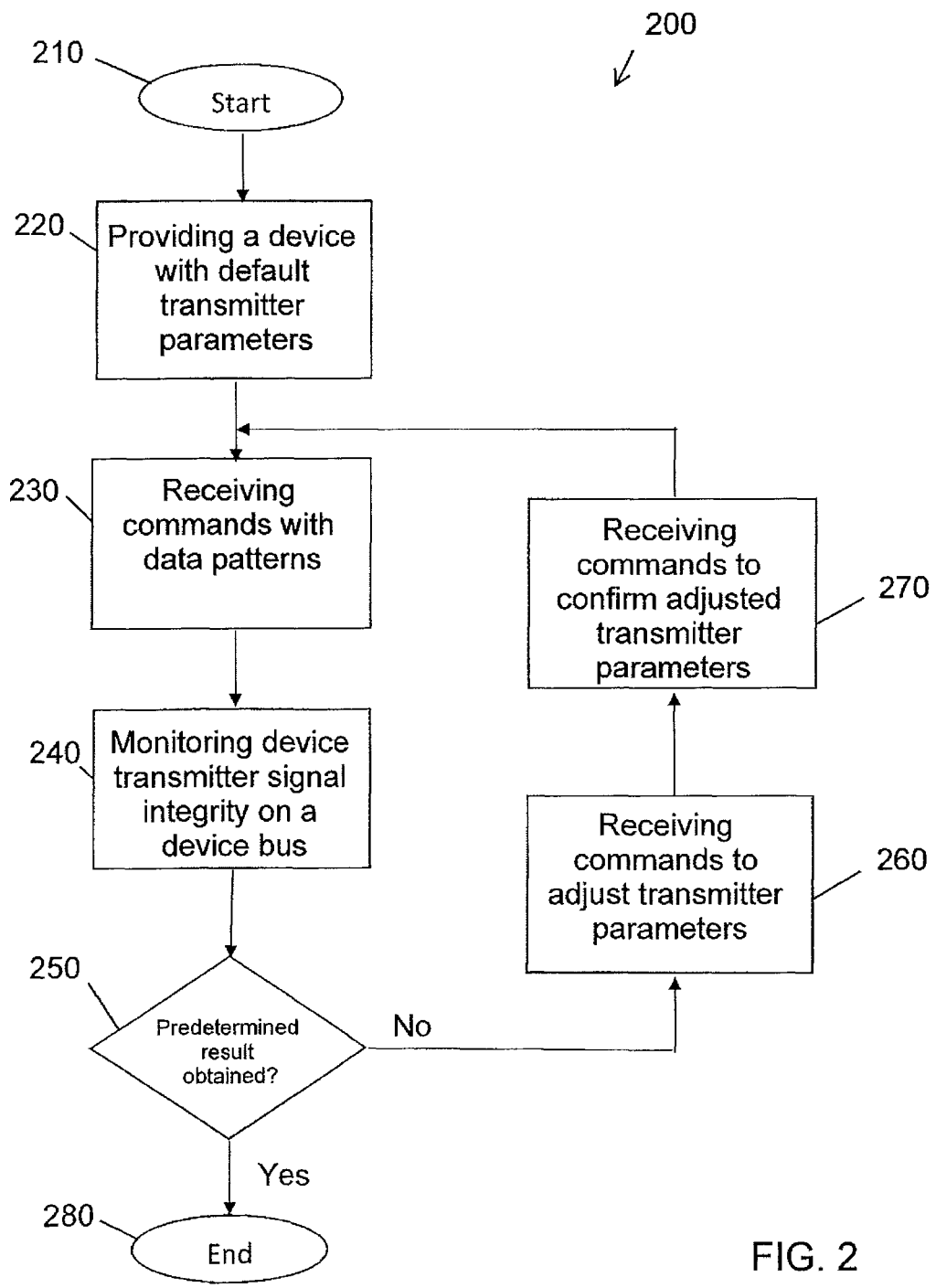
FIG. 2 is a flowchart showing a method for tuning device transmitter parameters according to an embodiment of the disclosure.

FIG. 2 is a flowchart showing a method 200 for tuning device transmitter parameters. The method starts at step 210. At step 220, the device (e.g., device 102) is powered up with default transmitter parameters. The method then goes to step 230, in which the device receives commands with test data patterns. The commands may be received from a host (e.g., host 104) and may include read/write commands with test data patterns that may be fixed data patterns. In one embodiment, the host sends a command to the device to write a test data pattern on a storage medium (e.g., storage tier) of the device. After the test data pattern is successfully written in device, the host may send a command to the device instructing it to read the written test data pattern. In response to receiving the read command from the host, the device may read the test data pattern from the storage medium and communicate the read data pattern to the host by a signal sent via a transmitter (e.g., interface 122) of the device. Step 240 includes monitoring device transmitter signal integrity on a device bus (e.g., SATA bus). In some embodiments, the signal integrity may then be monitored, such as by the oscilloscope monitoring technique described above or by any other suitable technique. In step 250, it is determined if a predetermined result was received (e.g., an acceptable signal integrity). If the result of step 240 is the predetermined result, the device transmitter is deemed to be tuned and the tuning process ends at step 280. If the result of step 240 is not the predetermined result (e.g., the signal integrity is not acceptable), the process moves to step 260. Step 260 includes the device receiving commands from the host to adjust the transmitter parameters. For example, the host issues a SCT command to modify the device's transmitter parameters, and the device modifies its transmitter parameters in response to receiving the SCT command. In some embodiments, the amplitude and emphasis parameters may be adjusted if the signal integrity is below a predetermined threshold (e.g., the s/n ration is below a predetermined threshold). Next, step 270 includes the device receiving commands to confirm the adjusted transmitter parameters. For example, the host issues a vendor SCT command to confirm the new parameter settings and the device provides a suitable response status to the host. The method then returns to step 230, where the device receives commands with data patterns (e.g., the host issues a read/write command), and monitors the signal integrity in step 240 to determine if the predetermined result (e.g., an acceptable signal integrity) was received in step 250. If the result was the predetermined result, the process ends at step 280. If the result was not the predetermined result, the method may iteratively repeat steps 260, 270, 230, and 240 to modify the transmitter parameters until the predetermined result is obtained (e.g., the signal integrity on the SATA bus is acceptable).

Various commands may be used to perform the functions for a device transmitter parameter tuning process. A SCT command may be used to carry out the simplified functions to enable the host 104 to select and set the desired device 102 transmitter parameters, query the current device transmitter parameter settings, and restore default device transmitter parameter settings. A command may include various fields with each field including values or information regarding the command (see e.g., the fields in FIG. 3A-3C). One command includes an Identify Device command which may be issued by the host to check whether the SCT device transmitter parameters tuning feature is supported by the device. The device may then report support of the feature by the SCT command transport in the identify device data. An SCT command to set or return device transmitter parameters will be aborted if the feature is not supported by the device.

Upon confirming that the tuning feature is supported, the host 104 may issue the SCT command with the vendor function code to adjust the device transmitter parameters (e.g., emphasis and amplitude). Thus, upon receiving the command from the host 104, the device 102 (1) verifies that the tuning feature is supported as well as enabled, (2) performs a parameter type and a range check on the parameter value provided by the host 104, and (3) programs the corresponding device SATA transmitter parameter register with the parameter.

Parameter values may be utilized in the form of a fixed value or an interval. A default value and interval for each parameter type may be vendor specific as it depends on device hardware and system design. For example, the transmitter emphasis default value may be 1.5 dB with three intervals in either direction such that each interval value is 0.5 dB. In this example, the adjustable range would occur from 0 to 3 dB. Likewise, the transmitter amplitude default value may be 720 mV with three intervals in either direction with each interval value is 40 mV. In this example the adjustable range would occur from 600-840 mV.

On successful completion of a parameter tuning command, the corresponding device transmitter parameter register may be set to the value in the parameter value field (e.g., parameter value field 331 in FIG. 3B), and the characteristic of the device's transmitter signal is adjusted according to the setting.

Parameter tuning may not be successful if an abort command occurs. The command may be aborted if the tuning feature is not supported and/or not enabled, the parameter identifier in parameter type field is not defined, or if the value in the parameter value field is out of range.

Another feature includes a parameter query feature. Here, the host 104 may issue an SCT command with a function code to retrieve the current device's transmitter parameter settings. The current transmitter parameters may then be updated in a pre-defined return value field in an ATA task file register.

Another feature includes a factory default feature, which provides a host 104 the option to issue an SCT command to reset transmitter parameter values to a device factory default setting. This feature enables the host 104 to restart the tuning process.

FIG. 3A is a diagrammatic illustration showing an example of read/write command fields. In FIG. 3A, an example read or write command 305 includes a feature field 310, a count field 312, a logical block addressing (LBA) field 314, a device field 316, and a command field 318. These different fields are described briefly below. The fields of command 305 may be used for read commands or write commands. Command 305 for a write command (e.g., SATA Write DMA EXT command) may be a command that writes data using Direct Memory Access (DMA) data transfer protocol. The command 305 for a read command (e.g., SATA Read DMA EXT command) may be a command that allows the host (e.g., host 104) to read data using the DMA data transfer protocol.

The feature field 310 may be reserved for various functions. The count field 312 may include values representing the number of logical sectors to be transferred. For example, a value of 0000h may indicate that 65 536 logical sectors are to be transferred. LBA is a scheme for specifying the location of blocks of data stored on a device and LBA field 314 may indicate the location of the first logical sector to be transferred to the device. The device field 316 may include values for bit descriptors, such as obsolete bit or a transport dependent bit. The command field 318 may include a write log (e.g., a Write log EXT and a Write log DMA EXT).

FIG. 3B is a diagrammatic illustration showing an example of a transmitter tuning command. In FIG. 3B, an example tuning command 321 includes an action code field 325, a function code field 327, a selection code field 329, and a parameter value field 331.

The action code field 325 may include a value which is the vendor code for the SCT transmitter tuning command. The function code field 327 may include one or a plurality of values to carry out various functions. For example, a value of 0000h may be a reserved value, 0001h may set the current transmitter emphasis value, 0002h may return the current transmitter emphasis value, 0003h may set the current transmitter amplitude value, 0004h may return the current transmitter amplitude value, and 0005h may restore the manufacturer's default transmitter parameter value. Other values, such as 0006h and on, may be reserved for other uses.

The selection code field 329 may include one of a plurality of values regarding the SATA generation in use. Further, selection code or values may be used to select parameters based corresponding to a particular SATA generation. For example, a value of 0001h may be SATA Gen 1, a value of 0002h may be SATA gen 2, and a value of 0003h may be SATA Gen 3. The parameter value field 331 may include a plurality of values for the valid range for transmitter emphasis tuning and the valid range for transmitter amplitude tuning.

FIG. 3C is a diagrammatic illustration showing an example of a transmitter tuning status response command 341. As discussed above, a host can query a device for current device transmitter settings. The host may query current parameters by issuing an SCT command to retrieve the value. In one embodiment, the current transmitter parameters may then be updated in a returned value field in a sector count register. In FIG. 3C, an example status response command 340 includes an error field 342, count field 312, LBA field 314, device field 316, and a status field 344.

The error field 342 may include values regarding possible error, bit description values may include an ID NOT FOUND bit, an ABORT bit, or an obsolete bit. The count field 312 may describe the device transmitter tuning returned value. The LBA field 314 may include a value for a reserved function. The device field 316 may include values for obsolete bits, transport dependent bits, and other reserved bits. The status field 344 may include a transport dependent bit, a sense data available bit, or an error bit.

Three types of fixed patterns for a read/write command (e.g., command 305) may be used in parameter tuning. The patterns include a High Frequency Test Pattern (HFTP), a Mid Frequency Test Pattern (MFTP) and a Low Frequency Test Pattern (LFTP). HFTP provides a maximum frequency allowed within SATA encoding rules and is repetitive. MFTP provides a middle frequency allowed within SATA encoding rules and is repetitive. LFTP provides a low frequency allowed within SATA encoding rules and is repetitive.

It should be noted that the description provided above in connection with FIGS. 3A, 3B, and 3C is for an embodiment in which the environment is within device 102 and host 104. For example, the device tuning command may be executed in module 110, such as by command module 114 and parameter tuning module 116 in device 102. Further, although commands with various fields have been discussed, the types of commands and fields need not be so limited, and one skilled in the art will recognize that various commands may be utilized, each with various fields, to carry out parameter tuning functions according to embodiments of the present disclosure. Further, although amplitude and emphasis are discussed as the parameters being adjusted, other parameters may be used and one skilled in the art will recognize that various parameters may be similarly adjusted according to embodiments of the present disclosure to enable the host to tune and select device transmitter parameters that suitably match their system without submitting the host system to the device manufacturer.

Figure 4:
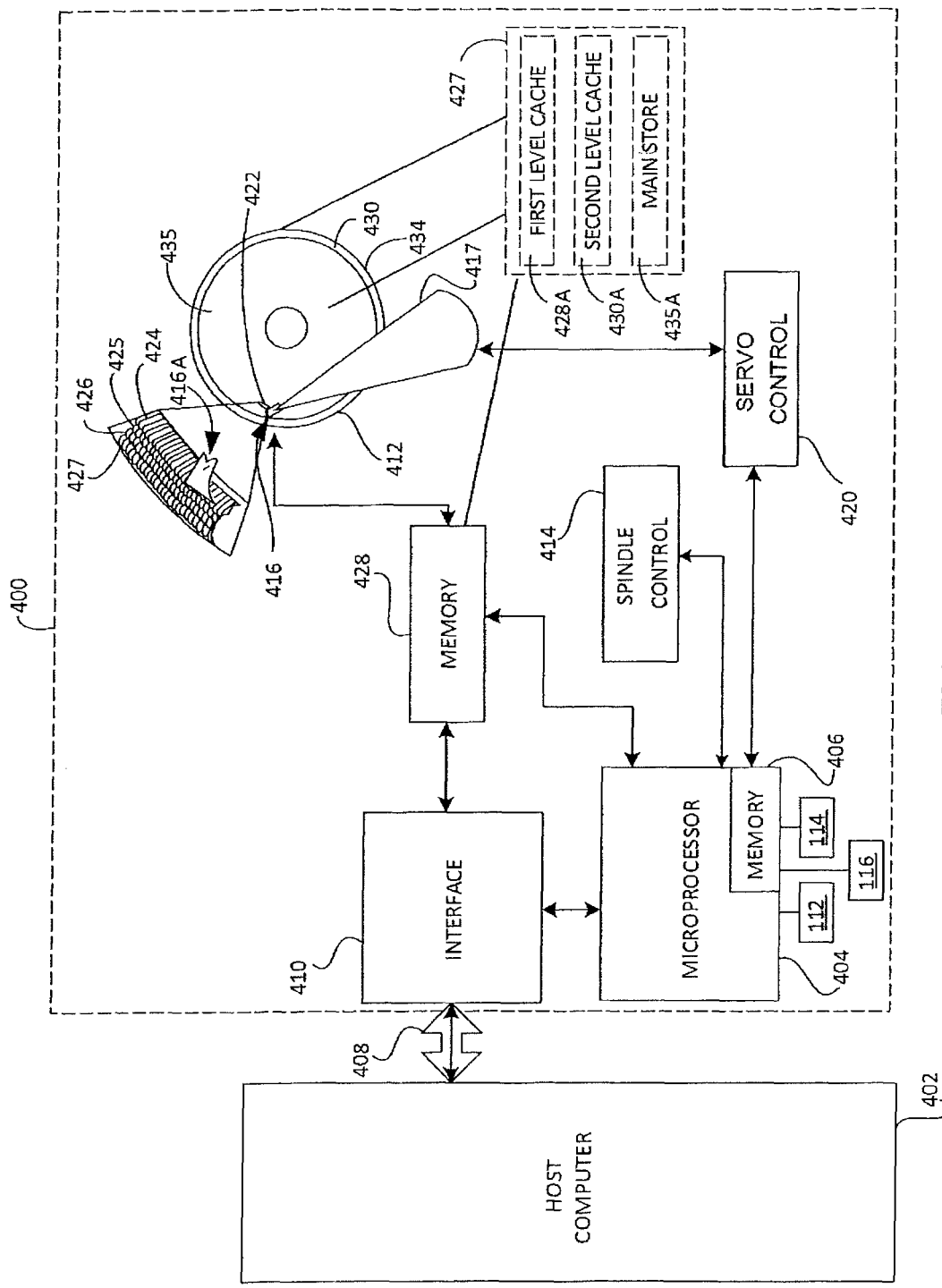
FIG. 4 is a block diagram of a data storage device that employs transmitter parameter tuning in accordance with one embodiment.

FIG. 4 shows a block diagram of the disc drive 400 that may employ a transmitter device parameter tuning process in accordance with one embodiment. Disc drive 400 is a particular example of a DSD 102 (of FIG. 1). As will be described in detail further below, in one embodiment, disc drive 400 employs one or more discs on which multiple data tracks may be written in a partially-overlapping shingled pattern, with each successive track overwriting a portion of the previous track. In another embodiment, disc drive 400 employs one or more discs on which no data tracks are written in a partially-overlapping shingled pattern.

Disc drive 400 is shown in FIG. 4 to be operably connected to a host computer 402 in which disc drive 400 may be mounted. Disc drive 400 may be similar to device 102 and host computer 402 may be similar to host 104. Disc drive 400 includes a microprocessor system 404 that generally provides top level communication and control for disc drive 400 in conjunction with programming for microprocessor system 404 stored, for example, in microprocessor memory 406. Disc drive 400 may communicate with host computer 402 using a bus 408.

Memory 406 can include RAM, read only memory ROM, and other sources of resident memory for microprocessor 404. Memory 406 may also include modules for carrying out transmitter parameter tuning (e.g., default parameter module 112, command module 114, and parameter tuning module 116 in storage controller 106 of FIG. 1).

Disc drive 400 includes one or more data storage discs 412. Discs 412 are rotated at a substantially constant high speed by a spindle control circuit 414. One or more heads 416 communicate with the surface(s) of discs 412 to carry out data read/write operations. The radial position of heads 416 is controlled through the application of current to a coil in an actuator assembly 417. A servo control system 420 provides such control.

As noted above, in some embodiments, tracks may be written on one or more storage discs 412 in a partially-overlaying relationship. The overlaying of tracks is shown in close-up view of area 422 of disc(s) 412. In area 422, a corner of head 416A is shown writing a track portion 424. Different shading within the track portion 424 represents different magnetic orientations that correspond to different values of stored binary data. The track portion 424 is overlaid over part of track portion 425. Similarly, track portion 425 is overlaid over part of portion 426, portion 426 is overlaid over portion 427, etc.

The portions 424-427 may be part of what is referred to herein as a physical band which, in this embodiment, may include tens, hundreds or thousands of similarly overlapping, concentric portions 424-427. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 424, 425, 426, 427, for example, are smaller than a width of a write pole (not separately shown) of head 416. However, a width of a reader (not separately shown) of head 416 may be small enough to read individual track portions 424, 425, 426, 427, thereby enabling random reads of data to be carried out.

In certain embodiments, disc drive 400 includes a memory 428 that may serve as, for example, a first/upper level cache denoted by reference numeral 428A. In some embodiments, memory 428 is physically separate from discs 412. The memory 428 may be of a different type than the discs 412. For example, in certain embodiments, memory 428 may be constructed from solid-state components. In one embodiment, memory 428 may be a Flash memory.

In some embodiments, the one or more storage discs 412 are managed as non-overlapping disc portion 430 and disc portion 435. In some embodiments, disc portion 430 is used for a second level cache denoted by reference numeral 430A and disc portion 435 serves as a main store denoted by reference numeral 435A. In an alternate embodiment, each of the first level cache 428A, the second level cache 430A and the main store 435A may be allocated from a pool of memory locations that includes, for example, storage locations from memory 428 and storage locations or physical bands from storage discs 412. Dashed box 427 of FIG. 4 indicates that, in the alternate embodiment, the entire set of storage locations that constitutes the storage space supplied by disc(s) 412 and memory 428 in disc drive 400 may be organized for three uses, namely the first level cache 428A, the second level cache 430A and main store 435A.

In the embodiment of FIG. 4, disc drive 400 may use memory 428 in conjunction with disc portion 430 in order to manage data as the data is being transferred to main storage locations 435 on disc(s) 412. In the interest of simplification, components such as a read/write channel which encodes data and provides requisite write current signals to heads 416 is not shown in FIG. 4. Also, any additional buffers that may be employed to assist in data transfer to the memory 428 and the main storage locations 435 are not shown in the interest of simplification.

In the embodiment of FIG. 4, bus 408 represents the communication channel with host computer 402, similar to the communications channel between host 104 and device 102 of FIG. 1. In one embodiment, the device parameter register is located in memory 406 of microprocessor 404, and modules (e.g., modules 112, 114, and 116) for transmitter parameter tuning may be similarly located in microprocessor 404 to carry out the tuning process, such as described in method 200 for tuning device transmitter parameters.

In one embodiment, a system adapted to instantiate transmitter parameter tuning on a DSD includes a DSD (e.g., device 102 or disc drive 400) communicatively coupled to a host system (e.g., host 104 or host computer 402). The DSD includes a processor (e.g., microprocessor 404) and a memory (e.g., memory 406) communicatively coupled to the processor. The memory having stored therein computer-executable instructions (e.g., modules 112, 114, and/or 116) to implement transmitter parameter tuning commands from the host system, which when executed, cause the DSD to iteratively adjust transmitter parameters until a predetermined result is obtained.

In another embodiment, a method of tuning a device transmitter to a host system is includes providing a device (e.g., device 102) with default transmitter parameters coupled to a host system (e.g., host 104). The method also includes issuing commands with fixed data patterns from the host system to the device. The method further includes monitoring device transmitter signal integrity for a predetermined result. Finally, the method includes iteratively adjusting device transmitter parameters until the predetermined result is obtained.

A device transmitter tuning process as described herein provides many advantages as the process enables a customer to carry out their own in-house device transmitter parameter tuning. One advantage is the process shortens product qualification time. A customer submitting their host system to the device manufacturer depends on the device manufacture to manually tune the product, which may result in long qualification periods. Qualification time may further lengthen when the process goes through multiple iterations. Thus, in-house tuning reduces customer reliance on the device manufacturer and may shorten qualification time. Another advantage is it allows a customer to tune the device parameters to achieve the desired setting for signal integrity, and this is of particular importance when a new host system or device is introduced. The process also enhances device reliability, as poor signal integrity can result in failures and errors in the communication link between the host and device. Failures can include a breakdown of the SATA link between the host and device which may result in data loss.

The illustrations of the embodiments described herein are intended to provide a general understanding of the method of the various embodiments. The illustrations are not intended to serve as a complete description of all of the elements and features of methods and systems described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method of tuning a device transmitter comprising:
    providing a device with transmitter parameters set to default factory values;
    receiving, in the device, from an external host, one or more write commands with test data patterns;
    executing, in the device, the one or more write commands to store the test data patterns on a non-transitory data storage medium of the device;

receiving, in the device, from the external host, one or more read commands for the test data patterns, and reading the test data patterns from the non-transitory data storage medium;

communicating the read test data patterns to the external host by a signal that is sent via the device transmitter;

monitoring a signal integrity for the device transmitter on a device bus;

receiving, in the device, a command instructing the device to update the transmitter parameter values when the signal integrity for the signal that is sent to the external host via the device transmitter is below a predetermined threshold; and adjusting the transmitter parameter values with new transmitter parameter values in response to the command instructing the device to update the transmitter parameters value's.

2. The method of claim 1 and further comprising executing, in the device, a command instructing the device to confirm the adjusted transmitter parameter values with a signal sent to the external host via the device transmitter.

3. The method of claim 2 and further comprising, until the device transmitter signal integrity is at least equal to the predetermined threshold, iteratively carrying out one or more of:

the receiving, in the device, from the external host, the one or more write commands with test data patterns;

the executing, in the device, the one or more write commands to store the test data patterns on the non-transitory data storage medium of the device;

the receiving, in the device, from the external host, the one or more read commands for the test data patterns, and the reading the test data patterns from the non-transitory data storage medium;

the communicating the read test data patterns to the external host by a signal that is sent via the device transmitter; and the receiving a command instructing the device to update the transmitter parameters values when the signal integrity for the signal that is sent to the external host via the device transmitter is below a predetermined threshold; and the executing, in the device, the command instructing the device to confirm the adjusted transmitter parameter values.

4. The method of claim 1 and wherein at least one of the transmitter parameters comprises signal amplitude.

5. The method of claim 1 and wherein at least one of the transmitter parameters comprises signal emphasis.

6. The method of claim 1 and further comprising receiving, in the device, a request for the transmitter parameter values.

7. The method of claim 6 and further comprising, in response to the request, providing the transmitter parameter values via the device transmitter.

8. The method of claim 2 and further comprising receiving, in the device, a command to reset the adjusted transmitter parameter values.

9. The method of claim 8 and further comprising executing, in the device, the command to reset the adjusted transmitter parameter values and thereby resetting the transmitter parameter values to the default factory values.

10. A data storage device comprising:

a memory having data storage device transmitter parameters stored in a device transmitter parameter register therein;

a data storage device transmitter that transmits and receives signals using the device transmitter parameters; and a control circuit communicatively coupled to the memory, the control circuit configured to adjust values of the device transmitter parameters of the data storage device transmitter in the memory in response to receiving device transmitter parameter update commands with adjusted values for the device transmitter parameters, the control circuit further configured to:

verify that device transmitter parameter value adjustment is supported and enabled in the data storage device;

perform a parameter type and range check on the adjusted values for the device transmitter parameters to verify that the adjusted device transmitter parameter values are valid; and program the device transmitter parameter register with the adjusted values.

11. The system of claim 10, and wherein the control circuit is further configured to provide the data storage device transmitter parameter values in response to receiving a parameter query command.

12. The system of claim 10, and wherein the control circuit is further configured to reset the data storage device transmitter parameter values to a default a default factory value in response to receiving a parameter reset command.

13. A method comprising:

providing a data storage device having device transmitter parameters set to default factory values for operation of a device transmitter; and providing transmitter parameter tuning adjustment capability in the data storage device that enables adjustment of the device transmitter parameter values without modifications to firmware of the data storage device;

tuning the transmitter parameters by:

providing adjusted device transmitter parameter values;

verifying that device transmitter parameter value adjustment is supported and enabled in the data storage device;

performing a parameter type and range check on the adjusted device transmitter parameter values to verify that the adjusted device transmitter parameter values are valid; and programming the device transmitter parameter register with the adjusted values.

14. The method of claim 13 and wherein tuning of a transmitter of the data storage device comprises:

receiving, in the data storage device, from an external host, one or more write commands with test data patterns;

executing, in the data storage device, the one or more write commands to store the test data patterns on a non-transitory data storage medium of the device;

receiving, in the data storage device, from the external host, one or more read commands for the test data patterns, and reading the test data patterns from the non-transitory data storage medium;

communicating the read test data patterns to the external host by a signal that is sent via the transmitter; and receiving, in the data storage device, a command instructing the data storage device to update the transmitter parameters values when a signal integrity for the signal that is sent to the external host via the device transmitter is below a predetermined threshold.

15. The method of claim 14 and further comprising executing, in the data storage device, a command instructing the device to confirm the adjusted transmitter parameter values.

16. The method of claim 15 and further comprising, until the device transmitter signal integrity is at least equal to the predetermined threshold, iteratively carrying out one or more of:
- the receiving, in the data storage device, the one or more write commands with test data patterns;
- the executing, in the data storage device, the one or more write commands to store the test data patterns on the non-transitory data storage medium of the device;
- the receiving, in the data storage device, the one or more read commands for the test data patterns, and the reading the test data patterns from the non-transitory data storage medium;
- the communicating the read test data patterns by a signal that is sent via the transmitter; and
- the receiving a command instructing the data storage device to update the transmitter parameters values when the signal integrity for the signal that is sent to the external host via the device transmitter is below a predetermined threshold; and
- the executing, in the data storage device, the command instructing the data storage device to confirm the adjusted transmitter parameter values.

17. The method of claim 14 and wherein at least one of the transmitter parameters comprises signal amplitude.

18. The method of claim 14 and wherein at least one of the transmitter parameters comprises signal emphasis.

19. The method of claim 14 and further comprising:
- receiving, in the data storage device, a request for the transmitter parameter values; and
- in response to the request, providing the transmitter parameter values via the transmitter.

20. The method of claim 15 and further comprising:
- receiving, in the device, a command to reset the adjusted transmitter parameter values; and
- executing, in the device, the command to reset the adjusted transmitter parameter values and thereby resetting the transmitter parameter values to the default factory values.

* * * * *